July 19, 1938.  G. BRASE  2,124,342
DEVICE FOR OPENING GARAGE DOORS
Filed Feb. 6, 1937  3 Sheets-Sheet 1
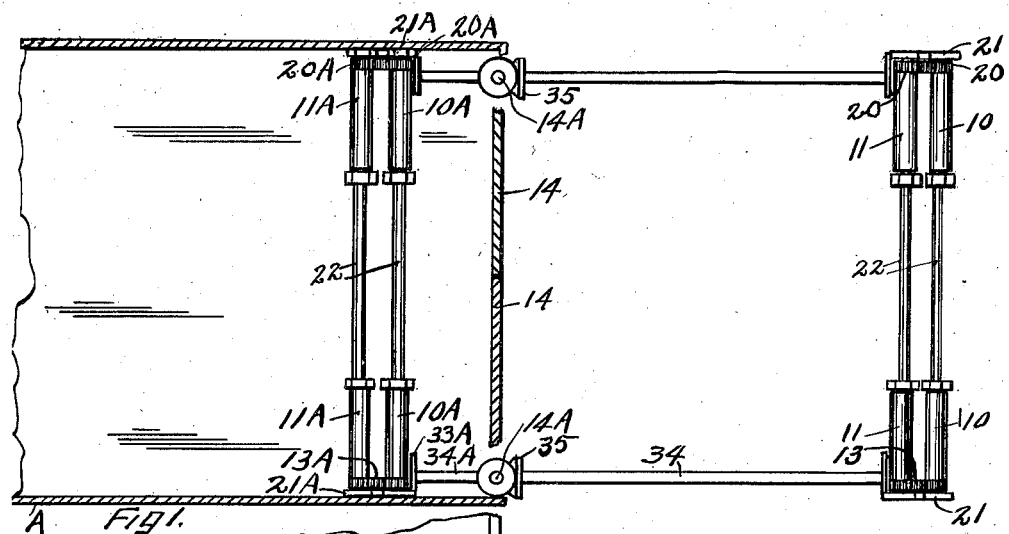
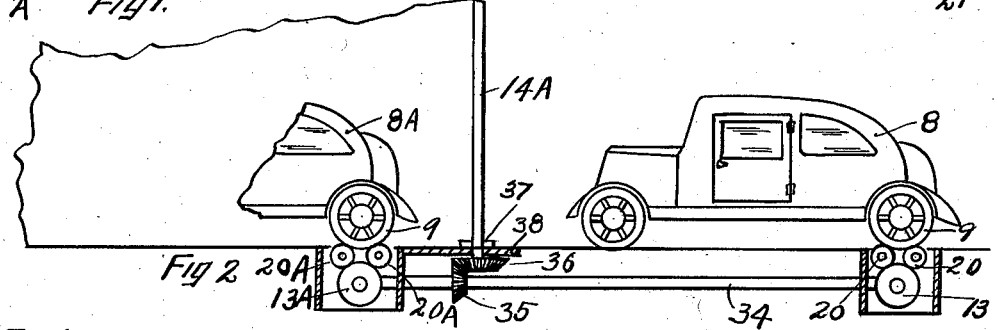
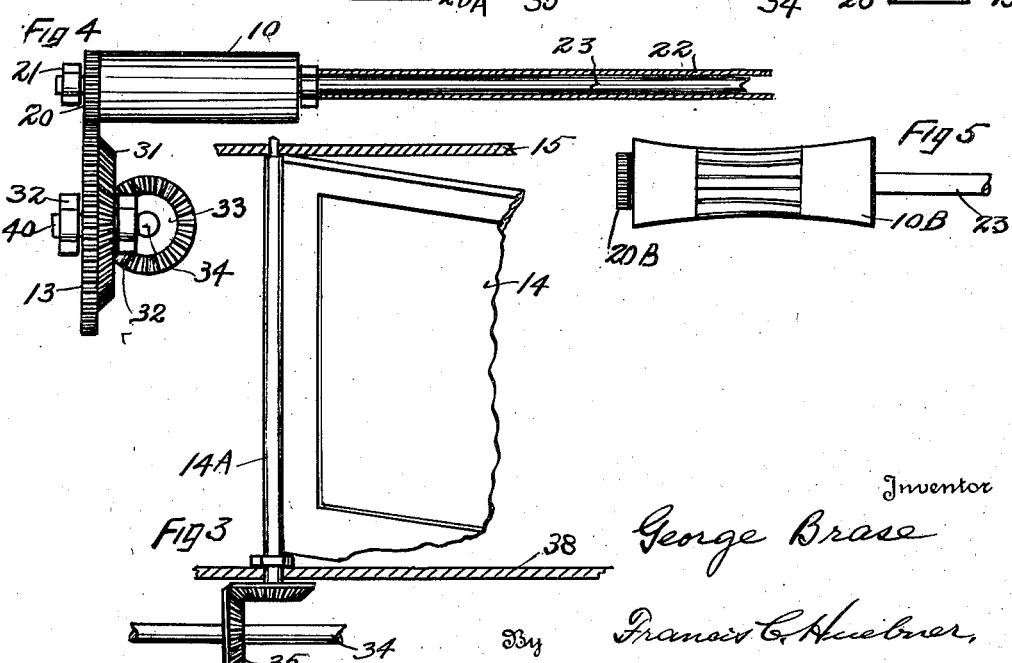

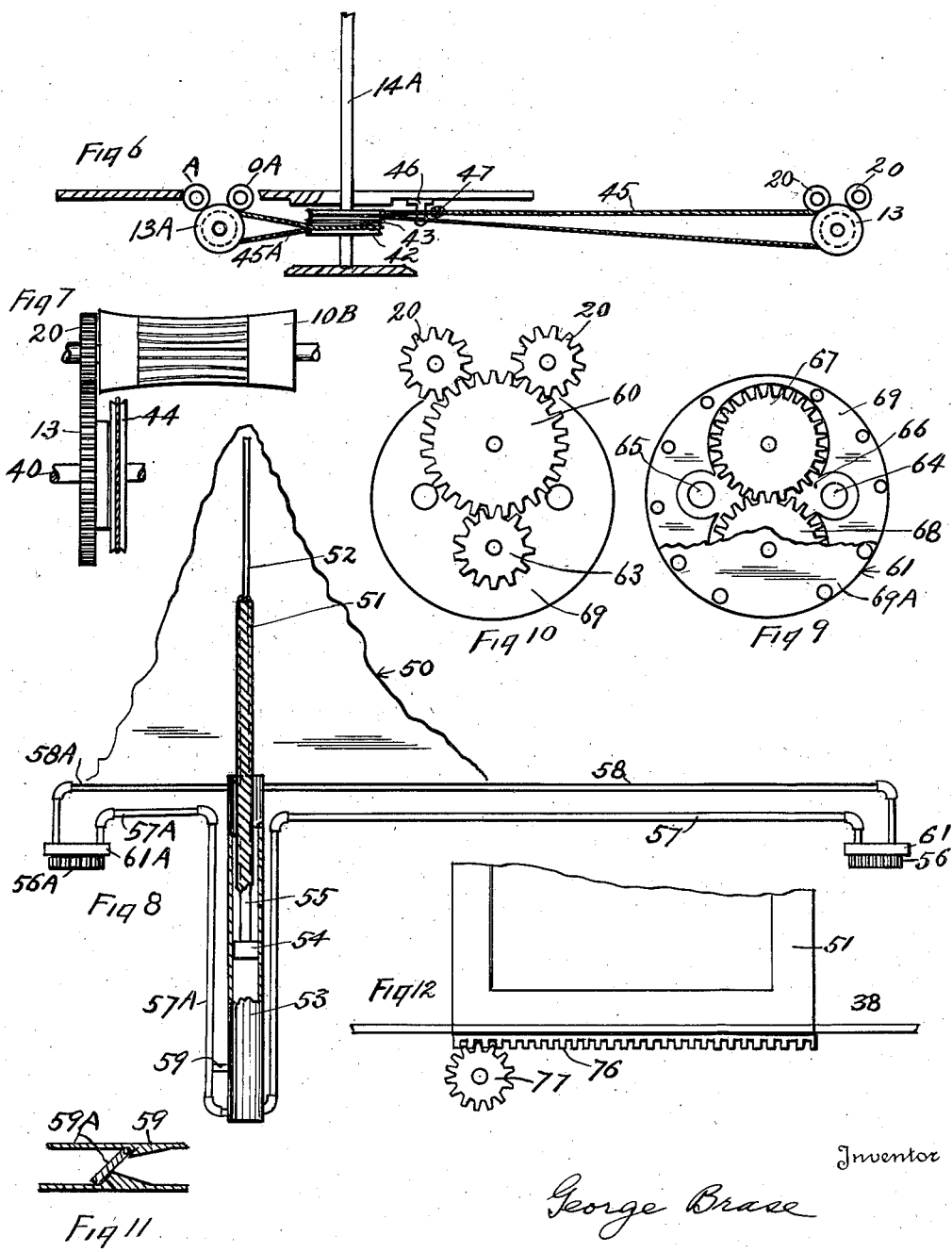

July 19, 1938. G. BRASE 2,124,342
DEVICE FOR OPENING GARAGE DOORS
Filed Feb. 6, 1937 3 Sheets-Sheet 3
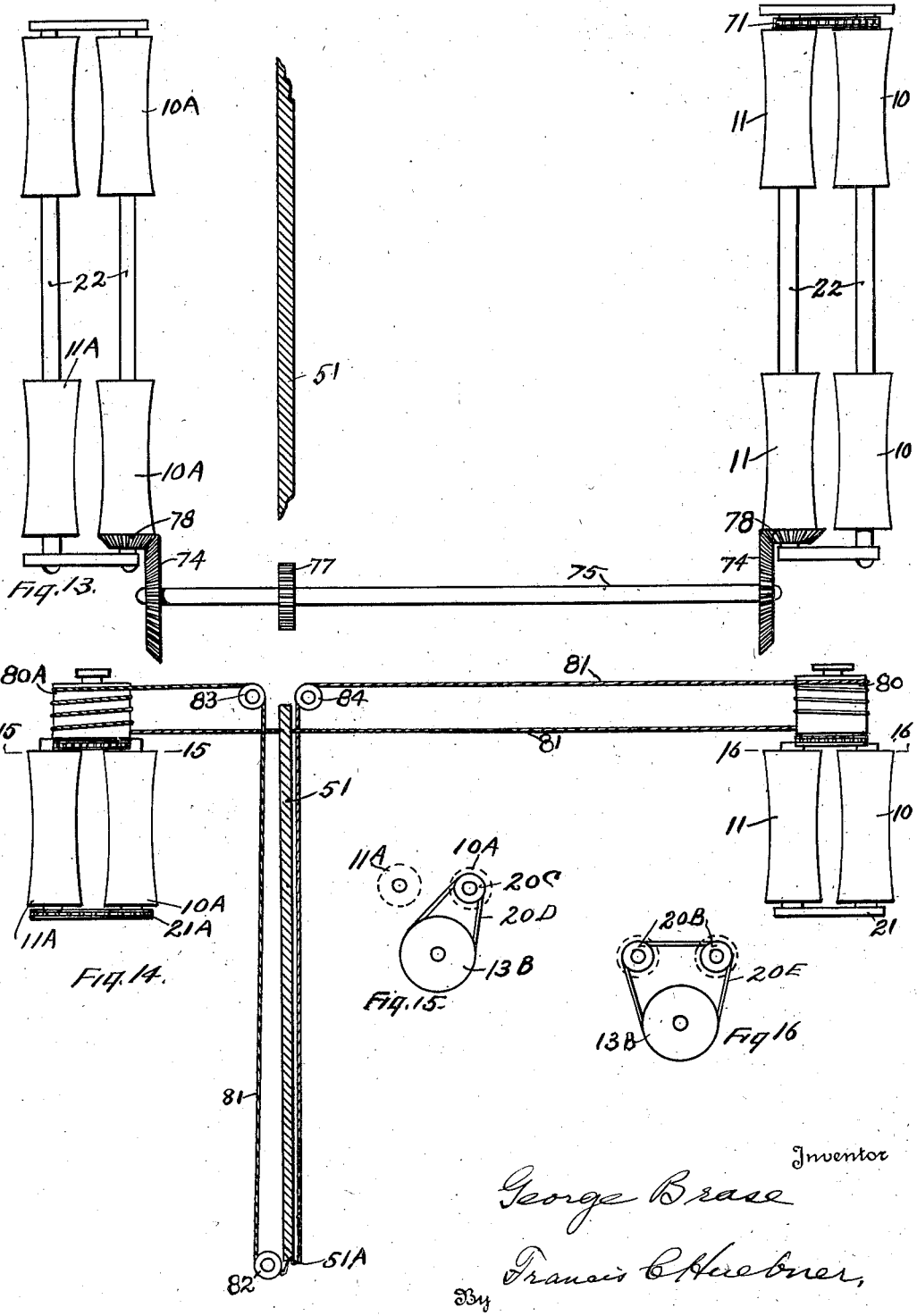

Patented July 19, 1938

2,124,342

UNITED STATES PATENT OFFICE 2,124,342

DEVICE FOR OPENING GARAGE DOORS

George Brase, North Fork, Calif.

Application February 6, 1937, Serial No. 124,457

3 Claims. (Cl. 268—41)

My invention relates to a device for opening and closing garage doors by means of the rotation of the wheels of the automobile. This is accomplished briefly by driving the automobile to the entrance of the garage where the rear wheels of the automobile engage rollers, which rollers are rotated by the automobile and thereby the door of the garage is opened or closed, depending on whether the automobile is in forward or reverse gear.

The object I have attained is the opening and closing of garage doors at will by the power supplied by the driving wheels of the automobile while the engine of the automobile is running. This and other objects hereinafter stated are accomplished by means of the device hereinafter described, and illustrated on the accompanying drawings in which Fig. 1 shows a top plan view of the device when constructed to carry the power by means of shafts and gears.

Fig. 2 is a side view of the device as shown in Fig. 1.

Fig. 3 is an enlarged view of the driving gear and driven gear assembled.

Fig. 4 is an enlarged view of the door and post supporting the door, showing the gear assembly for swinging the door to open or closed positions.

Fig. 5 is a modified form of roller adapted for engagement with the tire of the automobile wheel.

Fig. 6 is a side view of a modified form of the device in which the power is transmitted by belts.

Fig. 7 shows an enlarged view of the roller, the driving gear and the driven gear with the pulley attached thereto.

Fig. 8 is a top plan view of the device in which the power is transmitted by means of hydraulic pressure through tubes.

Fig. 9 shows a front view of the gear pump, having a portion of the housing removed, for pumping the fluid into the pipes.

Fig. 10 is a view of the pump on the reverse side shown in Fig. 9, showing the driving gears and the driven gear for operating the pump.

Fig. 11 is a sectional view of a check valve.

Fig. 12 is a modified form of the device when used to open sliding doors by means of a comb gear and an engaging wheel gear, said figure being a sectional view of the device along a face of the door.

Fig. 13 shows the same specie illustrated in Fig. 12 as viewed from the top, partly in section.

Fig. 14 is a top view of a modified form of the device when operated by a drum and cable, and adapted to be driven by one only of the driving wheels of the automobile.

Fig. 15 shows the driving wheels of the device along sectional line 15—15 in Fig. 14.

Fig. 16 shows the device along sectional line 16—16 in Fig. 14.

Referring to the drawings, I have constructed a garage A having a pair of doors 14, which terminate at the hinged end with an upright post 14A. The post 14A is hingedly connected to the floor 38 so the post is permitted a torsion movement, which movement is adapted to open and close the door. A block 37 is attached to the post above the floor to act as a thrust bearing when the door is opened or closed. At the lower end of the post is attached a beveled gear 36. To operate this gear and necessarily to swing the door to open or closed positions I have mounted rollers 10 and 11 in the driveway on a location where the rollers will be engaged with the drive wheel 9 of automobile 8 as the automobile is driven toward the door. Rollers 10 and 11 are spaced apart to better engage the drive wheel of the automobile. It is noted that when these rollers are rotated by the drive wheel of the automobile they will all move in the same direction, to-wit either clockwise or anticlockwise. At the ends of rollers 10 and 11 I have attached gears 20 which gears engage and rotate a gear 13. To gear 13 is attached a beveled gear 31 for the purpose of conveying the power at right angles to the movement of the rollers. A shaft 34 is provided with bevel gears 33 which are adapted to mesh with, and be driven by gear 31. Shaft 34 carries a bevel gear 35 which is meshed with and drives gear 35, the movement of gear 36 being adapted as heretofore explained to open and close the door. It is noted that there are preferably two rollers 10, one of which will engage either of the rear wheels when the rear wheel is the driving wheel of the automobile, and these two rollers are connected together with a shaft 23 which is encased in housing 22, as shown in Fig. 4. Bearings 21 are adapted to carry the shafts 23 of rollers 10 or 11, and bearings 32 carry shaft 40 on which gears 13 and 31 are mounted. It is also noted that duplicate mechanism for opening and closing the door is found spaced from the doorway and within the garage. In this assembly within the garage the pair of rollers is designated 10A and 11A, the bearings supporting the rollers 21A, the gears on the rollers 21A, and gear 13A is driven by the gears attached to the rollers. Short shaft 34A is an extension of shaft 34. By driving the rollers 10 and 11 anticlockwise the doors will open, and by driving rollers 10 and 11 clockwise the doors will close. The reverse is true of rollers 10A and 11A.

It is also noted that in the drawings I have represented an automobile in which the rear wheels are the drivers. By slight changes in positioning the rollers the device can be adapted for automobiles in which the front wheels are the drivers.

In Figs. 6 and 7 is shown a modified form of the device. In this form rollers 10 and 11 and 10A and 11A, and gears 20 and 20A, and driving gears 13 and 13A perform the same function as in the species hereinbefore described. To gears 13 and 13A pulleys 44 are attached, which pulleys carry belts 45 and 45A. In lieu of gear 36 shown in Fig. 2, pulleys 42 and 43 are substituted. Belt 45 conveys power from rollers 10 and 11 to pulley 43, which pulley when being rotated tends to swing the door open or closed. Belt 45A likewise conveys power from rollers 10A and 11A to the door.

It is noted that in Fig. 7 I have shown a modified form of roller 10B, said roller having a curved periphery, the periphery being grooved in order to provide better traction.

The species of devices hereinbefore explained are deviced for opening and closing doors which swing on a post or hinge. By a slight adaptation of the principle of the invention it can be adapted for use on sliding doors. One form of device is shown in Figs. 8, 9, 10 and 11. On these figures the moving power is a fluid used hydraulically. The gears 20 on rollers 10 and 11 operate a gear pump 61. The gear pump consists of a driving gear 60, which is substituted for the gear 13 shown in Figs. 1 and 2. Gear 60 drives gear 63, which gears are outside of housing 67. Within the housing is a chamber 66 in which chamber gears 67 and 68 enmesh and rotate together. Gear 68 being on the same shaft carrying gear 63, they rotate simultaneously. Chamber 66 has an opening 64 on one side of the meshed gears 67 and 68, and an opening 65 on the other side. A plate 69A is adapted as a cover for chamber 66. The sliding door 51 has a track or slot 52 in floor 50 which guides the door when moved to a closed or open position. A cylinder 53 has a piston 54 fitted therein, and piston 54 has a piston rod 55 attached thereto which piston rod engages the door and slides the door as the piston may be moved back and forth. A lead 58 connects opening 64 with one end of cylinder 53 and a lead 57 connects opening 65 with the other end of the cylinder. The cylinder and leads are filled with oil and when the gear pump 61 is operated the fluid in the leads and cylinder forces the piston 54 to one end or the other, thus moving the door. A duplicate pump 61A is within the garage and is actuated by the rollers 10A and 11A. Leads 58A and 57A function similarly to leads 57 and 58. An auxiliary lead 59 from the cylinder 53 to lead 57A contains a check valve 59A as shown in Fig. 11 which check valve permits the oil to by-pass from the cylinder to pump 61A, but which prevents it from passing in the opposite direction.

In Fig. 12 another form is shown. The pair of rollers 10 and 11 which are outside the garage are timed together with chain 71, which chain is carried by sprockets 72 and 73, said sprockets being attached at one end of rollers 10 and 11. At the other end of roller 11 is attached a gear pinion 78 which meshes with a larger beveled gear 74. This gear is carried on shaft 75 which is journaled so it runs at right angles to the door. It is here noted that the door 51 opens and closes by sliding it. On the under edge of the door is attached a rack, or comb 76. Shaft 75 carries gear 77 which is adapted to engage rack 76, and on the rotation of shaft 75 the door is moved to either a closed or open relation with the doorway. Rollers 10A and 11A are within the garage, and are positioned transversely to the line of travel of the automobile. Roller 11A runs idle, and to roller 10A is attached a pinion gear, or beveled gear 78A which is a duplicate of gear 78. Gear 78A engages gear 74A, said gear 74A being attached to, or mounted upon shaft 75. Gear 78A and gear 78 are duplicates. The fact that roller 11A runs idle permits the driving wheels of the automobile to rotate idle when the door is closed and roller 10A stops rotating. This idle roller 11A prevents the automobile from lunging off the rollers and into the wall of the garage when the door is closed while the automobile is still running.

Another plan for adapting the energy developed by rollers 10 and 11 to the closing of sliding doors is shown in Figs. 14, 15 and 16. In this form rollers 10 and 11 have pulleys 20B thereon, said pulleys or sprockets being adapted to drive sprocket 13B by means of a chain or belt 20E. To sprocket 13B a drum 80 is attached. Within the garage roller 11A runs idle. Roller 10A has a sprocket 20C attached, and with the cooperation of a chain or belt 20D, said roller drives sprocket 13B to which sprocket drum 80A is attached.

It is noted that the axis of drums 80 and 80A is approximately parallel with door 51 which is opened and closed by being slid lengthwise. A cable or rope 81 is attached to the door at the end of the door designated 51A on the drawings, thence it passes around pulley 82, thence around pulley 83 at the opposite end of the garage and in approximate line with the drums thence said cable passes around drum 80A, thence to drum 80 which it encircles, thence around pulley 84, and thence to the location 51A on the door where the cable started. It will be noted that by this arrangement when the drums are rotated in one direction the door will be pulled to open position, and when the drums are rotated in the opposite direction the door will be moved to a closed position. It is also noted that in this specie the rollers are adapted to engage one driver wheel only on the automobile.

It is further noted that there are various forms of stops which hold the rollers from rotating when the door is opened or closed. In Fig. 6 I have shown a knot 47 in cable 45, said cable passing through an anchored member 46. When the cable is moved so that the knot engages the anchored member, the rollers are stopped, and the automobile can be moved off of the rollers except the forward movement when within the garage and the driving wheel of the automobile engages the idler roller 11A. In Fig. 8 the stop is the closed ends of cylinder 53, which limit the movement of piston 54. In other forms an ordinary block may be used to stop the door at positions selected.

Having described my invention I claim as new and ask for Letters Patent:

1. In an enclosure adapted to house an automobile, said enclosure having a door, a slideway adapted for the door to be moved thereon to open and closed positions, means for moving the door consisting of rollers positioned to engage the driving wheels of an automobile, a rotary pump, one of said rollers on either side of the door being adapted to actuate said rotary pump, a closed tubular chamber, a piston slidably disposed in said chamber, a piston rod attached to the piston and extending through an end of the tubular chamber, means connecting the piston rod to the door, the movement of the piston back and forth being adapted to move the door therewith, and leads from the pump to either end of the closed chamber, said pump being adapted to force a liquid through the leads and in to the tubular chamber.

2. In combination with an enclosure adapted to house an automobile, said enclosure having a door adapted to be opened and closed, of means for opening and closing the door consisting of rollers positioned on either side of the door, a pump adapted to move a liquid, said rollers being adapted when engaged with the drive wheel of an automobile to be rotated and to actuate said pump, a closed cylinder having a piston adapted to slide therein, and a piston rod connecting the piston to the door, said piston and piston rod being adapted when moved to place the door in an opened and a closed position, leads from the pump to either end of the cylinder, liquid within the cylinder and leads adapted to be circulated by the pump, and an auxiliary by-pass from a lead to the cylinder.

3. In combination with an enclosure adapted to house an automobile, said enclosure having an opening and a door adapted to be moved to open or close said opening, means for moving said door to open or closed positions consisting of rollers positioned to engage the wheels of an automobile when said automobile is adjacent to said enclosure, a pump adapted to move a liquid, one or more of said rollers being adapted to actuate said pump when the roller is rotated, a closed chamber, a piston slidably disposed in said chamber and adapted to be moved from one end of the chamber toward the other end by liquid pressure against the piston, means connecting the piston with the door, the movement of the piston back and forth in the chamber being adapted through the means connecting the piston with the door to move said door therewith, and leads from the pump to either end of said chamber adapted to carry liquid from the pump to said chamber.

GEORGE BRASE.